United States Patent
Meunier et al.

(10) Patent No.: US 10,466,376 B2
(45) Date of Patent: Nov. 5, 2019

(54) DEVICE AND METHOD FOR VELOCITY FUNCTION EXTRACTION FROM THE PHASE OF AMBIENT NOISE

(71) Applicant: CGG SERVICES SA, Massy (FR)

(72) Inventors: Julien Meunier, Paris (FR); Thomas Bianchi, Paris (FR); Fabien Espeute, Paris (FR)

(73) Assignee: CGG SERVICES SAS, Massy (FR)

( * ) Notice: Subject to any disclaimer, the term of this patent is extended or adjusted under 35 U.S.C. 154(b) by 546 days.

(21) Appl. No.: 14/889,063

(22) PCT Filed: Jun. 2, 2014

(86) PCT No.: PCT/EP2014/061346
§ 371 (c)(1),
(2) Date: Nov. 4, 2015

(87) PCT Pub. No.: WO2014/195257
PCT Pub. Date: Dec. 11, 2014

(65) Prior Publication Data
US 2016/0070013 A1     Mar. 10, 2016

Related U.S. Application Data

(60) Provisional application No. 61/891,055, filed on Oct. 15, 2013, provisional application No. 61/830,196, filed on Jun. 3, 2013.

(51) Int. Cl.
G01V 1/30 (2006.01)
G01V 1/28 (2006.01)
G01V 1/32 (2006.01)

(52) U.S. Cl.
CPC ............... *G01V 1/303* (2013.01); *G01V 1/28* (2013.01); *G01V 1/30* (2013.01); *G01V 1/32* (2013.01);
(Continued)

(58) Field of Classification Search
USPC .......................................................... 702/18
See application file for complete search history.

(56) References Cited

U.S. PATENT DOCUMENTS

2007/0104028 A1* 5/2007 Van Manen ........... G01V 1/003
                                                                              367/38
2011/0046885 A1* 2/2011 Bussat .................... G01V 1/28
                                                                              702/14

(Continued)

FOREIGN PATENT DOCUMENTS

EP          0455091 A2    11/1991

OTHER PUBLICATIONS

International Search Report in related International Application No. PCT/EP2014/061346, dated Feb. 27, 2015.
(Continued)

*Primary Examiner* — Paul D Lee
(74) *Attorney, Agent, or Firm* — Patent Portfolio Builders PLLC

(57) ABSTRACT

Methods and systems for deriving S-wave velocity information from the low-frequency content of ambient noise are described. The ambient noise can be collected on a dedicated record or on a production record associated with the receivers of a three-dimensional seismic survey. The methods and systems use one of a plurality of analysis models selected based on quality factors of the ambient noise data. The methods and systems analyze the data at a plurality of single frequencies then transform the velocity versus frequency data into velocity versus depth data.

20 Claims, 13 Drawing Sheets

(52) U.S. Cl.
CPC .... *G01V 2210/123* (2013.01); *G01V 2210/40* (2013.01); *G01V 2210/6222* (2013.01); *G01V 2210/65* (2013.01)

(56) References Cited

U.S. PATENT DOCUMENTS

| | | | |
|---|---|---|---|
| 2012/0039150 A1* | 2/2012 | Eick | G01V 1/005 367/41 |
| 2012/0043091 A1 | 2/2012 | Leahy et al. | |
| 2012/0053839 A1* | 3/2012 | Kugler | G01V 1/30 702/13 |
| 2012/0081999 A1* | 4/2012 | Halliday | G01V 1/364 367/24 |
| 2012/0155217 A1* | 6/2012 | Dellinger | G01V 1/005 367/38 |

OTHER PUBLICATIONS

J. Xia et al., Estimation of Near-Surface Shear-Wave Velocity by Inversion of Rayleigh Waves, Geophysics, May-Jun. 1999, vol. 64, No. 3, pp. 691-700.
H. Zhang et al., "Passive Seismic Tomography Using Induced Seismicity at a Petroleum Field in Oman", Geophysics, Nov.-Dec. 2009, vol. 74, No. 6, pp. WCB57-WCB69.
Written Opinion in related International Application No. PCT/EP2014/061346 dated Feb. 27, 2015.

* cited by examiner

DEVICE AND METHOD FOR VELOCITY FUNCTION EXTRACTION FROM THE PHASE OF AMBIENT NOISE

RELATED APPLICATION

The present application is related to, and claims priority from U.S. Provisional Patent Application No. 61/830,196, filed Jun. 3, 2013, entitled "VELOCITY FUNCTION EXTRACTION FROM THE PHASE OF AMBIENT NOISE," to Julien MEUNIER, Thomas BIANCHI and Fabien ESPEUTE, and U.S. Provisional Patent Application No. 61/891,055, filed Oct. 15, 2013, entitled "VELOCITY AND REFLECTIVITY INFORMATION EXTRACTION FROM LOW FREQUENCY AMBIENT," to Julien MEUNIER, Thomas BIANCHI and Fabien ESPEUTE, the disclosures of which are incorporated herein by reference in their entirety.

TECHNICAL FIELD

Embodiments of the subject matter disclosed herein generally relate to methods and systems for seismic data processing and, more particularly, to mechanisms and techniques for deriving velocity information, associated with seismic data, based on ambient noise composition.

BACKGROUND

Seismic data acquisition and processing techniques are used to generate a profile (image) of a geophysical structure (subsurface) of the strata underlying the land surface or seafloor. Among other things, seismic data acquisition involves the generation of acoustic waves, the collection of reflected/refracted versions of those acoustic waves and processing the collected seismic data to generate the image. This image does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process in the field of seismic surveying.

Considering the improvement of seismic images, the determination of a velocity function is an important step in the processing of seismic data. The velocity function (or velocity model) is a mathematical representation of the speed of a wave through a medium, in this instance the speed of a seismic wave through the underlying ground strata. The velocity function is necessary for processing seismic data. The velocity function, once determined, can be used to convert a time domain velocity model to a depth domain velocity model, a domain capable of removing structural errors inherent in time migration. A velocity function can be computed by different techniques, e.g., a ray-tracing algorithm in conjunction with a time-to-depth conversion algorithm, but this, and other, techniques are computationally intensive and have other limitations associated with the accuracy of the velocity function over the seismic area of interest and the amount of data required to perform the analysis.

Moreover, the propagation velocity in a given medium is related to a particular physical property of the medium. In particular, the knowledge of both P-wave and S-wave velocity leads to a Poisson ratio of the medium. Accordingly, it would be desirable to provide systems and methods that avoid the afore-described problems and drawbacks, and provide methods to derive a velocity function which are more accurate and/or less computationally intensive.

SUMMARY

According to an embodiment, there is a method for analyzing seismic data. The method includes receiving low frequency content of ambient noise associated with seismic data; identifying one or more sources of the ambient noise for each of a plurality of analyzed frequencies; separating the one or more sources of ambient noise; based on an analysis of the low frequency content associated with one of the one or more sources of ambient noise, generating a plurality of velocity versus frequency functions associated to one or more geographical locations; and transforming the plurality of velocity versus frequency functions into a plurality of velocity versus depth functions.

According to another embodiment, there is a method for deriving S-wave velocity data from noise data. The method includes transforming the noise data in a frequency-wavenumber domain; generating an azimuth independent one-dimensional (1-D) velocity versus frequency function based on the frequency-wavenumber transformed noise data; and transforming the azimuth independent 1-D velocity versus frequency function into a 1-D velocity versus depth function.

According to still another embodiment, there is a method for deriving S-wave velocity data from noise data. The method includes transforming the noise data in a frequency-wavenumber (F-Kx-Ky) domain; generating an azimuth dependent 1-D velocity versus frequency function based on the frequency-wavenumber transformed noise data; and transforming the azimuth dependent 1-D velocity versus frequency function into a 1-D azimuth dependent velocity versus depth function.

According to still another embodiment, there is a method for generating a low frequency reflectivity image from seismic data. The method includes separating a plurality of body waves from a plurality of surface waves associated with the seismic data; generating interferometrically reconstructed body waves based on a cross-correlation of each body wave seismogram by all other body wave seismograms associated with the seismic data; and processing of data associated with the interferometrically reconstructed body waves to generate a low frequency reflectivity image.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology of deriving S-wave velocity information based on the analysis of the low-frequency content of ambient noise. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The presented embodiments describe, for example, methods and apparatus for deriving S-wave velocity information based on the analysis of the low-frequency content of ambient noise. The ambient noise can be collected on a dedicated record of its own or extracted from a production record associated with a seismic survey. The ambient noise is analyzed first on a per-frequency basis and assimilated into a multi-dimensional velocity function based on horizontal, i.e., x and y spatial, coordinates and an associated frequency. Next, the multi-dimensional horizontal coordinate-frequency velocity function is converted into a multi-dimensional velocity function based on horizontal and vertical, i.e., z spatial, coordinates.

In order to provide some context for the subsequent embodiments for deriving S-wave velocity information based on the analysis of the low-frequency content of ambient noise, consider first a seismic data acquisition process and system as will now be described with respect to FIGS. 1 and 2.

Figure 1:
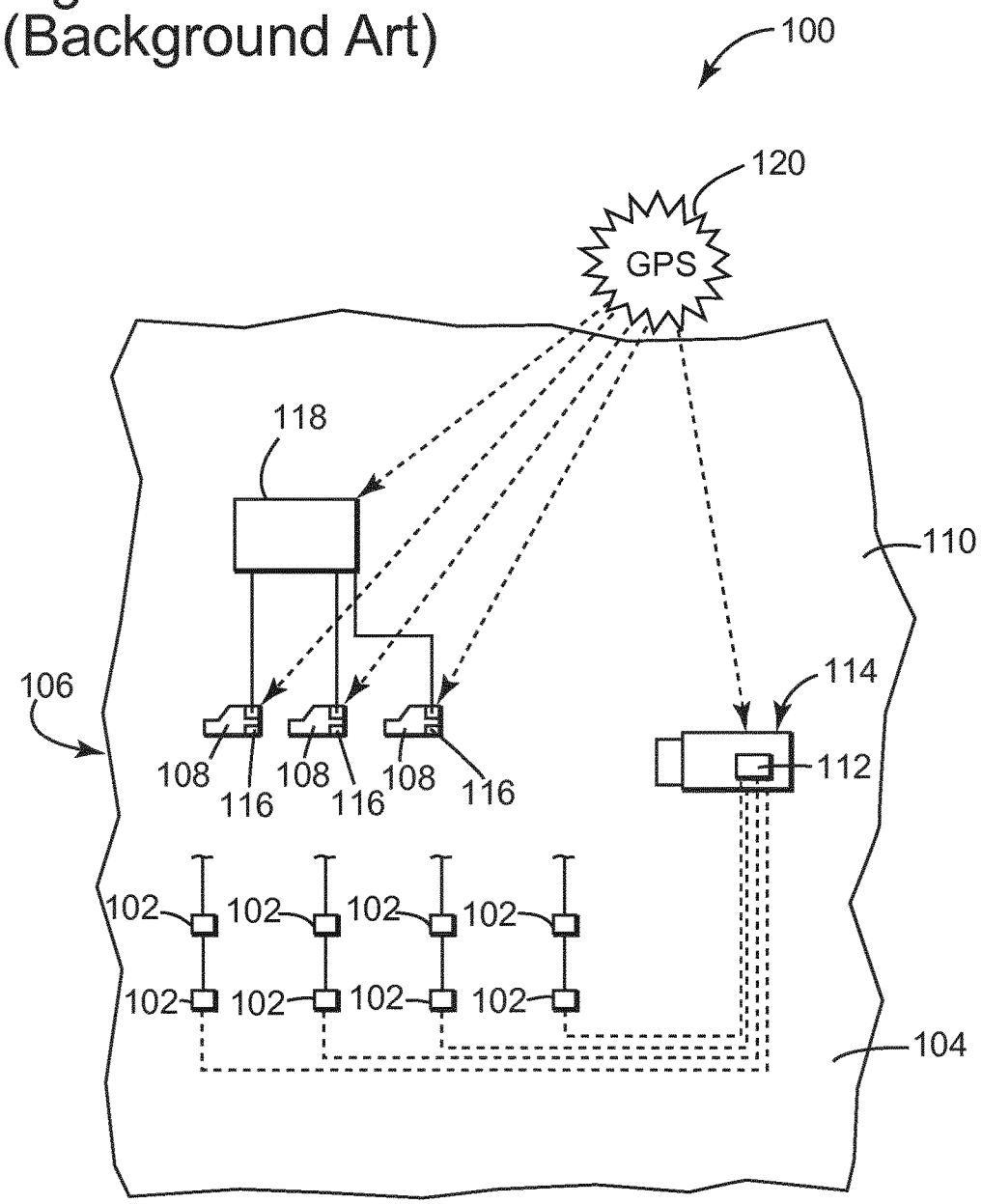
FIG. 1 shows various aspects of a conventional onshore seismic data acquisition system.

A configuration for achieving seismic monitoring is illustrated in FIG. 1. FIG. 1 shows a system 100 for the acquisition of seismic data. The system 100 includes plural receivers 102 positioned over an area 104 of a subsurface to be explored and in contact with, or below the surface 106 of the ground. A number of sources 108 are also placed on the surface 106 in an area 110, in a vicinity of the area 104 of the receivers 102. Alternatively, sources 108 may be buried under surface 106. A recording device 112 is connected to the plurality of receivers 102 and placed, for example, in a station/truck 114. Each source 108 can be composed of a variable number of vibrators, typically between one and five, and can include a local controller 116. A central controller 118 can be provided to coordinate the shooting times of sources 108. A global positioning system (GPS) 120 can be used to time-correlate the sources 108 and the receivers 102.

With this configuration, sources 108 are controlled to generate seismic waves, and the plurality of receivers 102 records waves reflected by the oil and/or gas reservoirs and other structures.

Figure 2:
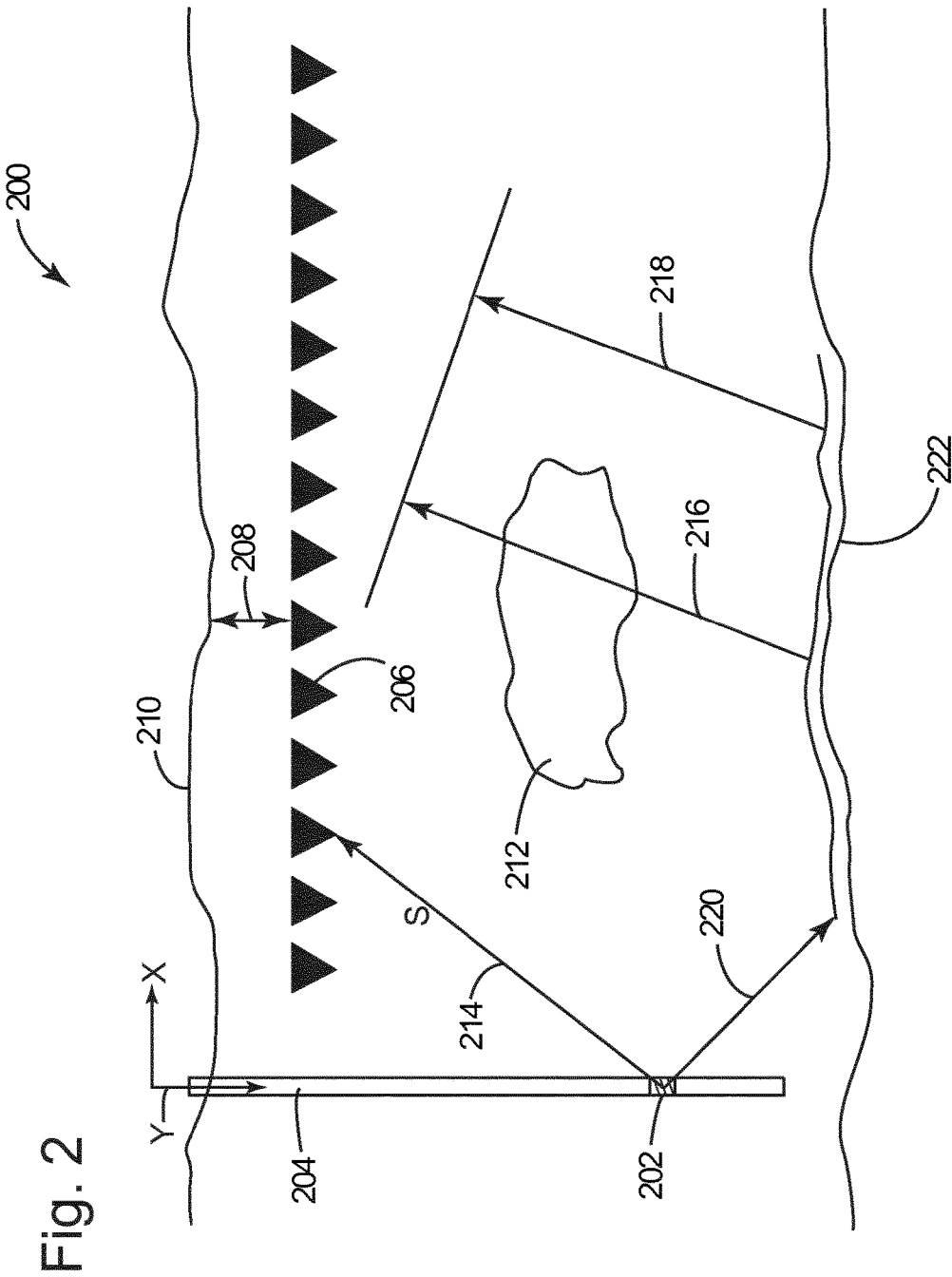
FIG. 2 illustrates wave propagation for a land source buried below seismic receivers.

FIG. 2 shows a seismic system 200 that includes at least a seismic source 202 that can be provided in a well 204. It should be noted that the source can be any known source, e.g., the source can be a SeisMovie source (developed by CGG Services, France) that includes piezoelectric vibrator elements that can provide a wide bandwidth and high reliability/repeatability. The source may be used to emit mono-frequencies or one or more sweeps. A plurality of receivers 206 are buried at a predetermined depth 208 relative to a surface of the earth 210. The predetermined depth can be a distance greater than zero and less than the depth of the reservoir. In one embodiment, the predetermined depth is 12 meters. The receivers can be three-component (3C) geophones or four-component (4C), i.e., a 3C geophone and a hydrophone. However, it should be noted that other types of receivers can be used.

In another embodiment, the system 200 includes hundreds, e.g., 480, of 3C receivers buried at about 12 meters and tens, e.g., eleven, of sources configured to continuously emit seismic waves. The sources 202 can be provided in one or more wells at a depth of approximately 80 meters. The data can be recorded for tens of days, e.g., 80 days. Further, the data can be averaged to produce a single set and the data can be used to show that the acquisition system 200 and survey design are ideally suited to obtain estimates of S-wave attenuation for the top soil (near surface) with high spatial resolution. It should be noted that the top soil is considered to be that portion of the ground that is above the receivers 206 and is sometimes referred to as the weathering layer.

The speed of the S-waves in the near surface may be estimated from recording refracted S-waves. FIG. 2 shows a direct S-wave 214, i.e., a wave that propagates from the source 202 directly to the receivers 206. FIG. 2 also shows refracted S-waves 216 and 218. The refracted S-waves 216, 218 are a result of a down-going S-wave 220 that gets refracted from a structure 222. It is noted that the direct S-wave 214 is recorded with a small offset (i.e., distance from the source to the receiver along the X axis is small) while the refracted S-waves 216, 218 are recorded with medium to large offsets.

The above configurations require a man-made seismic source and powerful computation devices for processing the acquired seismic data for determining the S-wave's speed. However, as now discussed, the S-wave's speed may also be determined based on the ambient noise, i.e., without the need of a man-made seismic source. The determination of ambient noise can be conducted for establishing the adequacy of receiver sensitivity at the frequencies of interest. This determination is accomplished by generating phase maps of ambient noise at a plurality of constant frequencies. A phase map may be defined in various ways. For example, a trace recorded by one or more receivers may be processed (e.g., apply Fourier transform) to a frequency domain, in which a dominant frequency is selected and its phase plotted to generate the phase map. Those skilled in the art would appreciate that other mathematical transformations may be used for determining the dominant frequency. Analysis of the phase maps predicts instrument noise domination if there is non-coherency between adjacent traces and seismic noise domination if there is coherency between adjacent traces.

However, according to these embodiments, ambient noise is used instead of man-made seismic source to calculate the velocity function. For example, it can be seen from an analysis of the phase maps of the ambient noise that the observable patterns show interferences between waves propagating in different directions from different locations. Specifically, the interferences can clearly be observed at very low frequencies from 0.1 Hz up to approximately 5 to 10 Hz. These interferences are caused by noise sources, which can be identified and separated, i.e., resolved. Once the interferences are resolved, the phase maps can be used to make wavelength measurements, and with the known frequencies, the aforementioned wavelength measurements can directly be used to determine velocity as a function of frequency, i.e., dispersion information.

Figure 3:
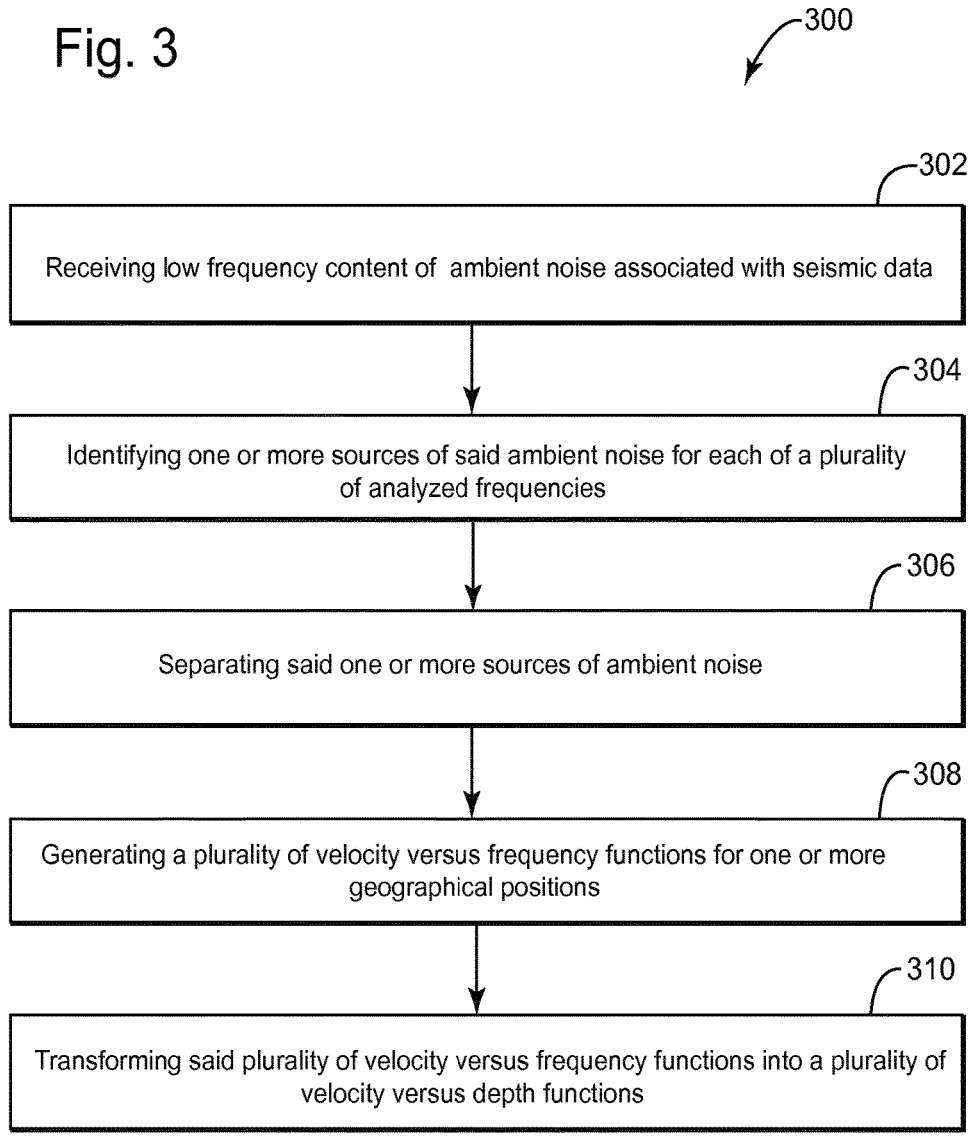
FIG. 3 is a flowchart of a method for generating velocity versus depth functions.

Thus, according to an embodiment illustrated in FIG. 3, a first method f-x-y (i.e., a method that relies on frequency and horizontal coordinates) 300 for generating a plurality of velocity versus depth functions is discussed based on an analysis of low-frequency content of ambient noise, associated with seismic data. It should be noted that the data can be a dedicated ambient noise record or a production seismic data record associated with the receivers of a three-dimensional seismic survey based on the fact that most of the energy generated by the seismic source occurs at frequencies higher than the frequencies used in the present method. Starting at step 302, the method 300 receives low-frequency content of ambient noise associated with the seismic data. Next at step 304, the method identifies one or more sources of ambient noise for each of a plurality of analyzed frequencies. This identification may be performed, for example, based on the amplitude of each ambient noise source because the ambient noise sources have different amplitudes.

In step 306, the first method separates the one or more ambient noise sources. The separation may be based on the amplitudes discussed above. The separation can be performed in a frequency-horizontal coordinate domain, based on the analysis of phase maps. Continuing at step 308, the method 300 analyses the field radiated by each one of the one or more sources of ambient noise in order to generate a plurality of velocity versus frequency functions associated to one or more geographical positions. In other words, based on an analysis of the low frequency content associated with one of the one or more sources of ambient noise, this step generates a plurality of velocity versus frequency functions associated to one or more geographical locations. The one or more geographical locations may be or not associated with the one or more sources of ambient noise. It should be noted that the velocity versus frequency function generation is based on applying one of a plurality of analysis models of varying complexity, wherein the desired analysis model is selected based on factors associated with the ambient noise data. It should further be noted that the factors include, for example, spatial sampling data density, seismic/non-seismic noise ratio data quality and residual interference separation data quality.

Next, at step 310, the method 300 transforms the plurality of velocity versus frequency functions into a plurality of velocity versus depth functions. It should be noted that this transformation process is known in the art as described in the article entitled "Estimation of near-surface shear-wave velocity by inversion of Rayleigh waves," by J. Xia, et. al., published in 1999 in Geophysics, 36, 3, pages 691-700 hereinafter (XIA) and incorporated herein by reference in its entirety. Thus, a description of this step is omitted herein.

Figure 4:
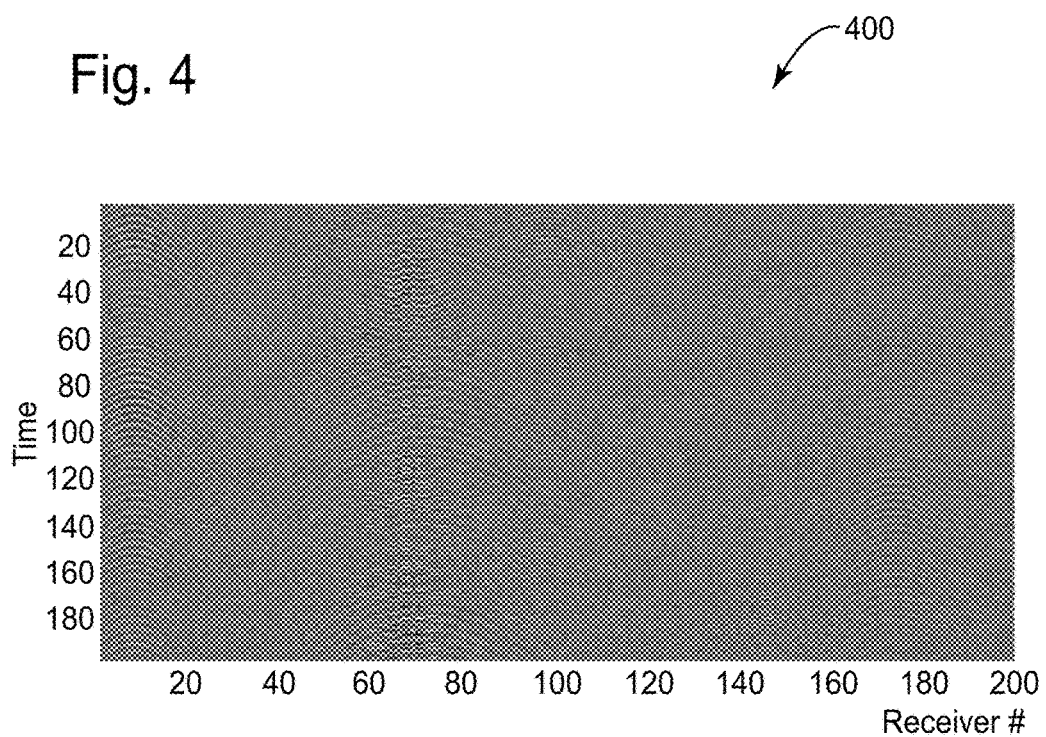
FIG. 4 is a diagram illustrating ambient noise observed on one receiver line.

Further, projecting the wavelength measurements onto the observation plane, i.e., the surface of the earth (see FIG. 5), produces an extraction of information that is the projection of the (apparent) velocity onto the observation plane. FIG. 4 depicts the ambient noise observed at one receiver line. It should be noted that the (apparent) velocity can be a function of the source-to-receiver distance, the direction of propagation of the wave, the X and Y coordinates and the frequency. It should further be noted that if the (apparent) velocity does not depend on the source-to-receiver distance, then the source is on the surface and the wave is a surface wave.

Next, considering that data collection is performed through vertical motion sensors, the detected waves can be "Rayleigh waves," i.e., ground roll, and under these circumstances algorithms are available to derive S-wave velocity functions from the collected data. However, if horizontal motion sensors are employed and the "Love" waves are separated from the "Rayleigh" waves, then the "Love" waves can be analyzed in a similar fashion. It should be noted that because these frequencies are significantly lower than the range of frequencies used for seismic exploration, the associated velocity functions will be defined at depths exceeding most target depths.

If at least three sources can be identified and separated, then, in each point of the observation domain, velocity will be estimated in three directions. Accordingly, the horizontal anisotropy of S-wave horizontal velocity can be estimated at these points.

Figure 5:
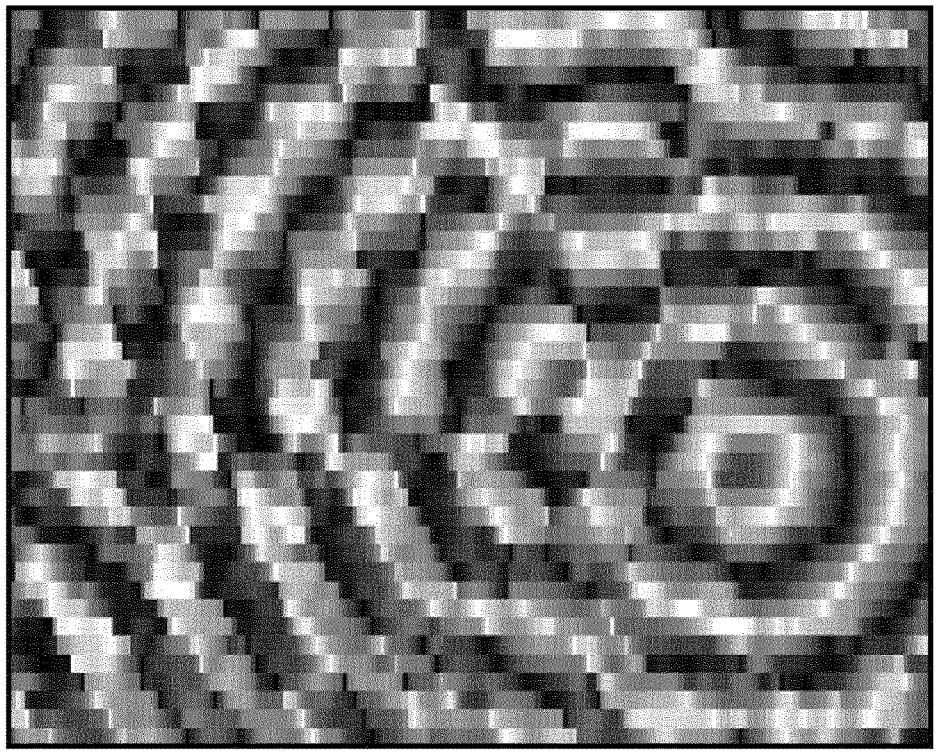
FIG. 5 is a diagram illustrating a phase map at a given frequency.

With regard to step 304, each recorded frequency is investigated for noise sources. If noise sources are detected, e.g., a point with a maximum amplitude and a circular amplitude decay is observed in the vicinity of the point, then the detected noise source is separated from the record. FIG. 5 shows a frequency-horizontal coordinate domain phase map recorded at 1.4 Hertz. Two noise sources 502 and 504 can be identified. The separation of the noise sources (i.e., step 306 in FIG. 3) can be performed by a variety of mechanisms. In one example, the separation can be performed in the frequency-horizontal coordinate domain (f, x, y) by the analysis of phase maps, e.g., by subtraction of a noise model defined by Xs, Ys (the X and Y coordinates of the source noise), source amplitude, source phase, amplitude decay and Earth anisotropy.

Figure 6:
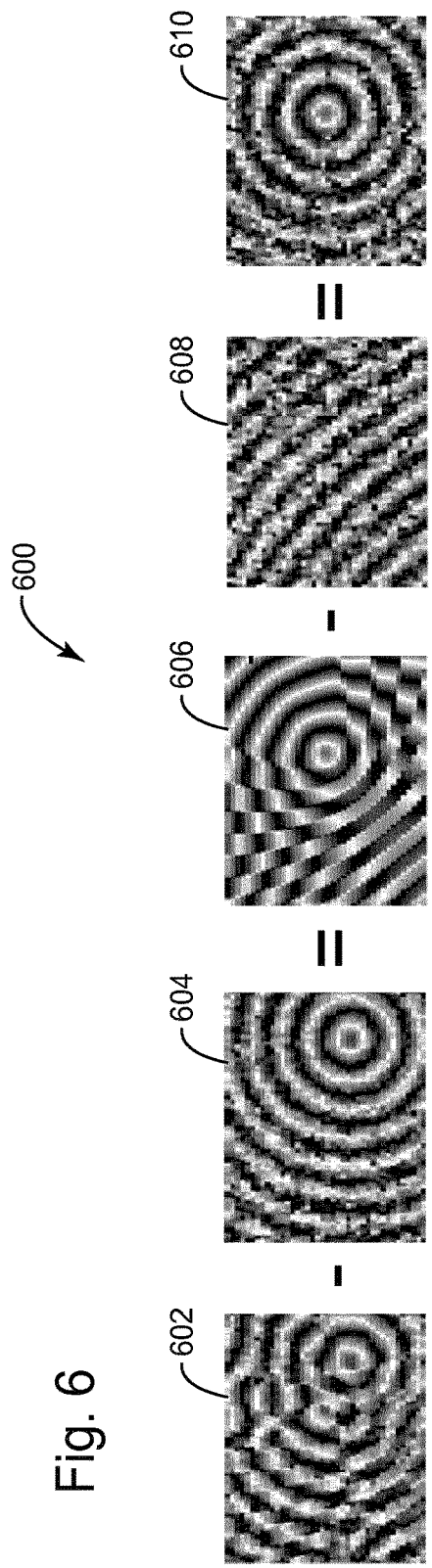
FIG. 6 is a diagram illustrating an iterative source separation process.

In another embodiment, the sources in step 306 can be iteratively separated as depicted in FIG. 6, based on subtracting a separated source from the phase map. For example, an image map of a first separated source 604 (corresponding to source 202 in FIG. 2) is subtracted from phase map 602 to produce a first residual phase map 606. First separated source 604 includes wave-fields in the time or frequency domain. Phase map 602 is obtained from measurements while first separated source 604 is a model. After subtracting the source model 604 from phase map 602, first residual phase map 606 includes a well-defined second source 609 and a third source (not shown because it is located outside the selected window of first residual phase map 606). Next an image map of a second separated source 608 is subtracted from the first residual phase map 606 to produce a second residual phase map 610 that illustrates third source 611. It should be noted that this process can be repeated for image maps of other sources producing additional residual phase maps. The complexity of the source separation makes the f-x-y method more difficult than the subsequently described F-Kx-Ky method, which does not require source separation.

According to another embodiment, a second method converts the recorded seismic data into the frequency-wavenumber domain (F-Kx-Ky), where F is the frequency, Kx is wavenumber associated with X spatial coordinate and Ky is the wavenumber associated with the Y spatial coordinate. This is possible for frequencies lower than the Vs/(2 RLI), where RLI is the receiver line interval. The RLI is the average distance between two adjacent lines of receivers. As an example, a velocity of 1 kilometer per second (km/s) and a line interval of 200 meters (m) allow observation of unaliased data up to frequencies of 2.5 Hz. In this domain, all waves traveling in the same direction $\alpha$ are found in the same plane, i.e., Ky=Kx tan($\alpha$), with Kx and Ky defininig a vertical plane of wave propagation and a defining the azimuth of the vertical plane. In the frequency-wave number domain, all waves traveling with velocity Vo are found on a cone centered on the origin with angle $\alpha$ given by a tan(1/Vo). Accordingly, all surface waves travelling in the same direction are found on the same point of a circle of radius K=f/Vo in the frequency slice of the F-Kx-Ky volume at frequency "f." In this embodiment sources are not separated.

Figure 7:
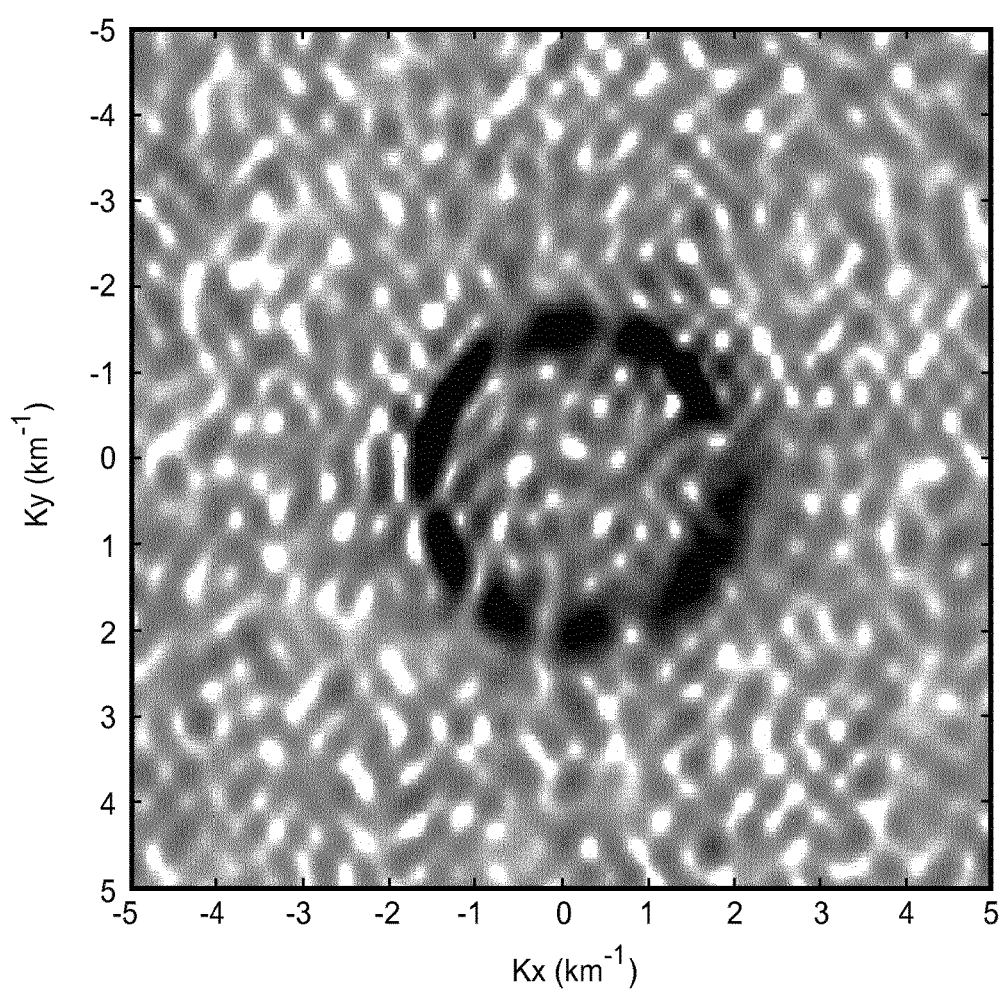
FIG. 7 is a diagram illustrating an F-Kx-Ky transform of a phase map.

FIG. 7 illustrates a frequency-wavenumber transform domain phase map recorded at 1.4 Hertz. Black circle 700 in FIG. 7 has a radius R given by R=FV, where F is the frequency and V is the speed. By measuring radius R and knowing the frequency F, it is possible to determine speed V. Note that at any given frequency, all waves propagating with the same velocity V are found on the same circle of radius R and all the waves propagating along direction $\alpha$ are found on a straight line of azimuth $\alpha$. Because the ambient noise is made of surface waves originating from various locations, and propagating in all directions with velocity $V_s(\alpha)$, all the contributions of the various sources at any frequency F are found on a same curve 700. If the velocity Vs does not depend upon $\alpha$, the curve is a circle.

Next, an analysis is performed to extract the information associated with the local parameters. It should be noted in the first method that the local parameters are presented as functions of the frequency and the horizontal coordinates. In the second method, the horizontal coordinates are not specifically determined; the parameters found by the analysis are associated with the center of the analyzed receiver area. This area is the receiver patch used in production and it moves together with the receivers while the seismic survey progresses. A receiver patch is an area over which the receivers are distributed. It should further be noted that the waves are analyzed with varying levels of complexity wherein the level of complexity applied is dependent on factors including, for example, the data density, i.e., spatial sampling, the quality of the data, e.g., the seismic/non-seismic noise ratio and the quality of the separation, i.e., the amount of residual interferences. The complexity of the model applied for the analysis can be represented as, for example, an isotropic one-dimensional model, i.e., no horizontal variation over the area of the analysis, an isotropic three-dimensional model, an azimuthally anisotropic one-dimensional model and an azimuthally anisotropic three-dimensional model.

At each frequency the information extracted by the analysis includes all or parts of the following local parameters: mean velocity, azimuth dependent velocity, azimuth of the fast axis, ratio of fast and slow velocities. It should be noted in the embodiment that this analysis/extraction is performed iteratively for a predetermined range of frequencies and the same local parameters can be extracted for each frequency. After the data has been transformed in the F-Kx-Ky domain and the region of this domain containing surface waves has been recognized, this region can be muted (i.e., multiplied by zero) and an inverse 3D Fourier transform may be used to reconstruct the data in the time-space domain. The reconstructed data will no longer contain surface waves. This process is called 3D FK filtering.

Figure 8A:
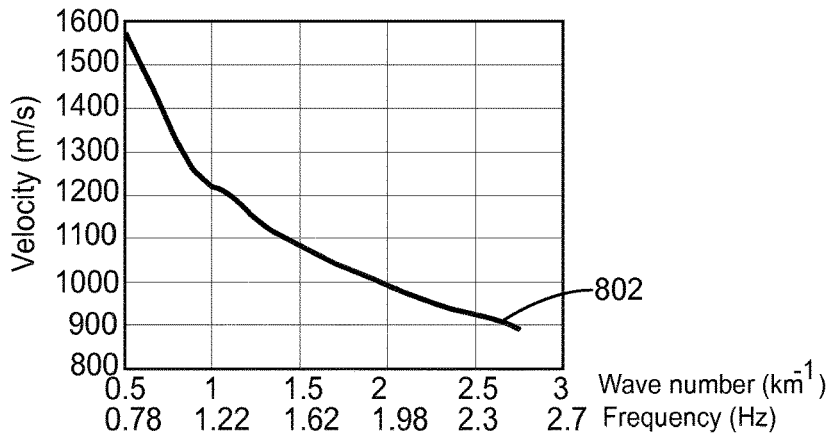
FIGS. 8A-C illustrate a velocity versus frequency/wave number plot, azimuth versus frequency/wave number plot and anisotropy versus frequency/wave number plot, respectively.
Figure 8B:
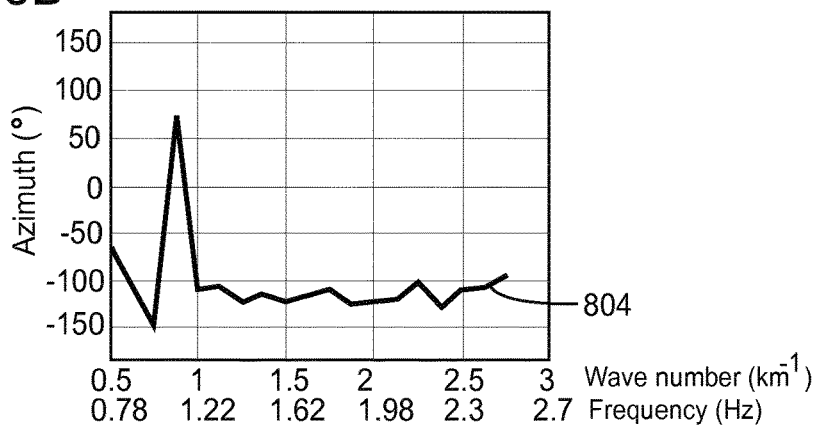
Figure 8C:
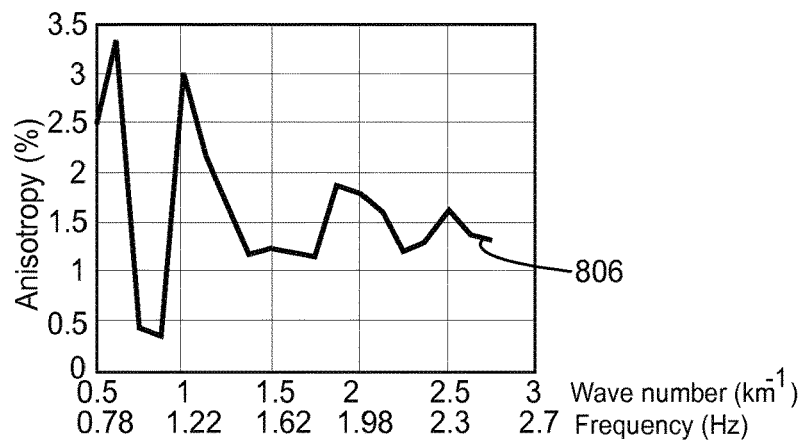

FIGS. 8A, 8B and 8C depict the result of an analysis based on the second method, e.g., a velocity versus frequency/wave number plot 802, an azimuth of fast axis versus frequency/wave number plot 804 and an anisotropy estimate, which is a function of the fast/slow velocities, versus frequency/wave number plot 806. Note that circle 700 in FIG. 7 may be an ellipse. For this case, the long axis is the slow axis and the short axis is fast axis. Corresponding velocities are also called fast and slow velocities and FIG. 8C illustrates a variation of the ellipse.

The second method may also include an inversion step of the dispersion data. The inversion may be a transformation of velocity versus frequency data into velocity versus depth data. An example of the inversion process is described in reference XIA discussed above.

Figure 9:
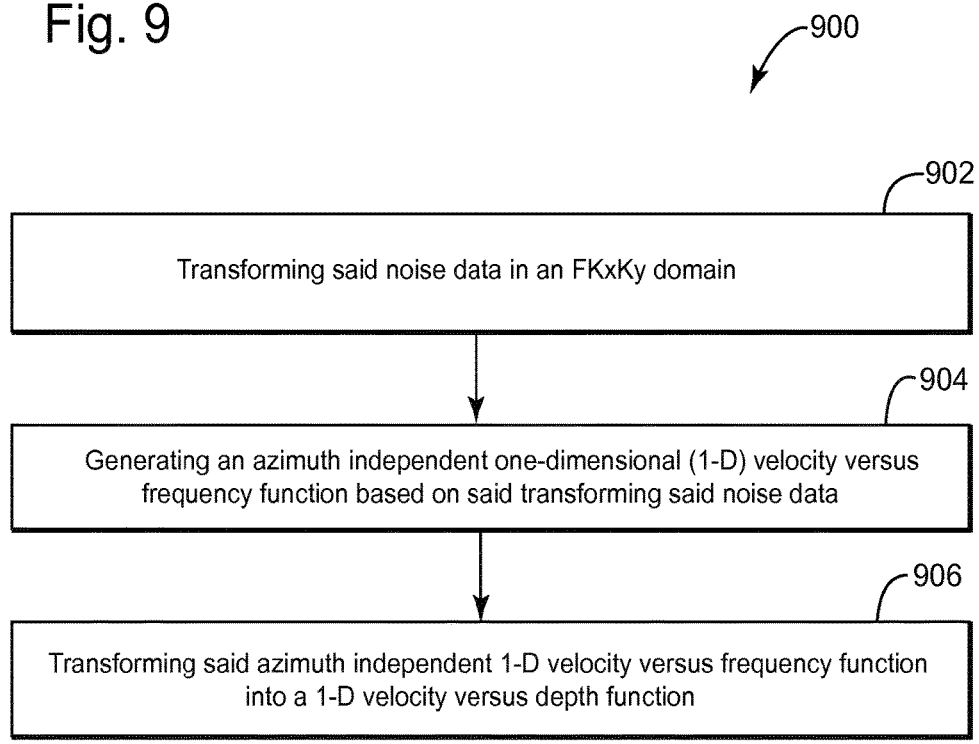
FIGS. 9-10 are flowcharts of various methods for deriving S-wave velocity data from noise data.

The second method is now discussed with regard to FIG. 9. Method 900 for deriving S-wave velocity data from noise data associated with acquired seismic data is depicted. It should be noted that the seismic data can be a dedicated ambient noise record or a production seismic data record associated with the receivers of a three-dimensional seismic survey. Starting at step 902, the method 900 transforms ambient noise associated with the acquired seismic data in an F-Kx-Ky domain.

In step 904, the method 900 generates an azimuth independent one-dimensional (1-D) velocity versus frequency function based on the previously described transformation of noise data in the F-Kx-Ky domain. To obtain azimuth independent velocity versus frequency function, the velocity is averaged. Note that the determination can be performed in a frequency-horizontal coordinate wave number domain, based on the evaluation of wave numbers as discussed above with regard to FIG. 7. In one application, the 1-D velocity versus depth function is associated with the center of gravity of an ensemble of receivers used to record the noise data. In another application, the method is applied to a plurality of receiver patches wherein successive 1-D velocity versus depth functions associated with the center of gravity of successive receiver patches are used to generate a 3-D velocity versus depth function.

In step 906, the generated azimuth independent 1-D velocity versus frequency function is transformed into a 1-D velocity versus depth function.

Figure 10:
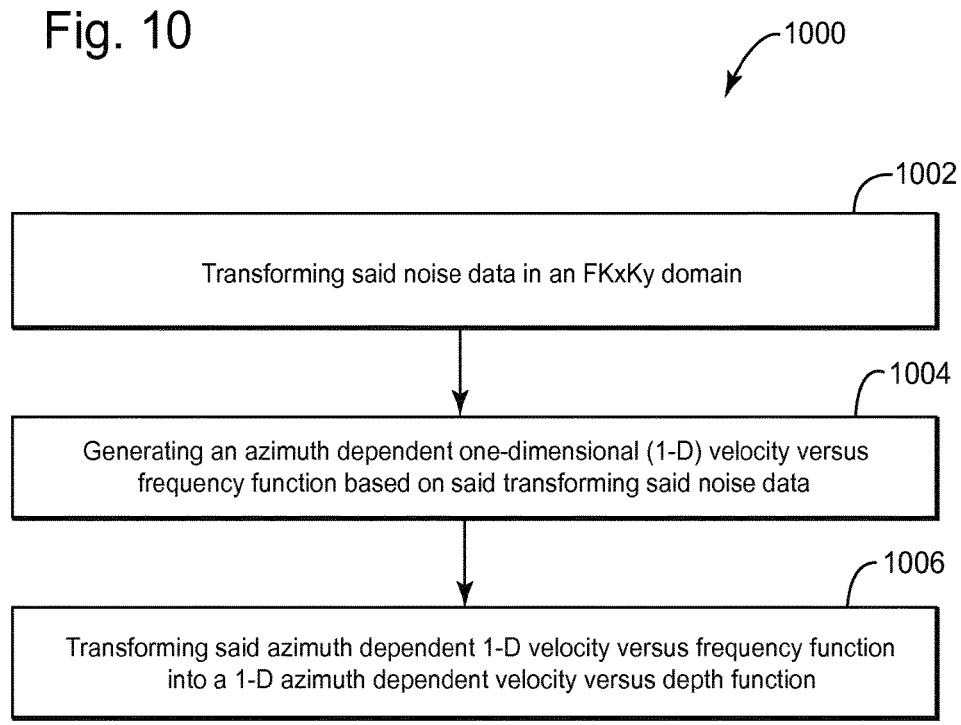

Alternatively, as illustrated in FIG. 10, another method 1000 for deriving S-wave velocity data from noise data associated with seismic data is depicted. It should be noted that the data can be a dedicated ambient noise record or a production seismic data record associated with the receivers of a three-dimensional seismic survey. Starting at step 1002, the method 1000 transforms the noise data in an F-Kx-Ky domain, similar to method 900.

However, in step 1004, the method 1000 generates an azimuth dependent 1-D velocity versus frequency function based on the previously described transformation of the noise data in the F-Kx-Ky domain. The velocity versus frequency function is azimuth dependent in this method, meaning that the velocity is not average, but rather a function of various quantities, e.g., azimuth, anisotropy ratio ($V_{fast}/V_{slow}$), etc. The transformation can be performed in a frequency-horizontal coordinate wave number domain, based on an analysis of wave numbers Kx and Ky.

The 1-D velocity versus depth function may be associated with the center of gravity of a plurality of receivers used to record the noise data. The method may be applied to a plurality of receiver patches wherein successive 1-D velocity versus depth functions associated with the center of gravity of successive receiver patches are used to generate an azimuth dependent 3-D velocity versus depth function.

In step 1006, the method 1000 transforms the azimuth dependent 1-D velocity versus frequency function into a 1-D azimuth dependent velocity versus depth function.

The velocity versus frequency function generation is based on applying one of a plurality of analysis models of varying complexity wherein the desired analysis model is selected based on factors associated with the ambient noise data. The factors include, for example, spatial sampling data density, seismic/non-seismic noise ratio data quality and residual interference separation data quality. The process of transforming the velocity versus frequency function to velocity versus depth function is known in the art, see for example the XIA reference.

Two properties of the 3D Fourier transform from the time-space domain $\{x,y,t\}$ to a frequency-wave number domain $\{f, K_x, K_y\}$ are now discussed. First, the wave number coordinates define the vertical plane of wave propagation as:

$$Ky = Kx \tan(\alpha),$$

where $K_x$ and $K_y$ are the wave numbers along the X and Y axis and a is the azimuth of the vertical plane. Second, any surface wave propagating with velocity $V_0$ is found on the cone centered on the origin with angle:

$$\varphi = a\tan(1/V_0) = a\tan((Kx^2 + Ky^2)^{0.5}/F),$$

where F is the frequency of the plane wave whatever the location of its source. Based on the fact that ambient noise is comprised of surface waves originating from various locations and propagating in all directions with velocity $V_s(\alpha)$, the contributions of all the various sources for any frequency are found on the same curve.

Figure 11:
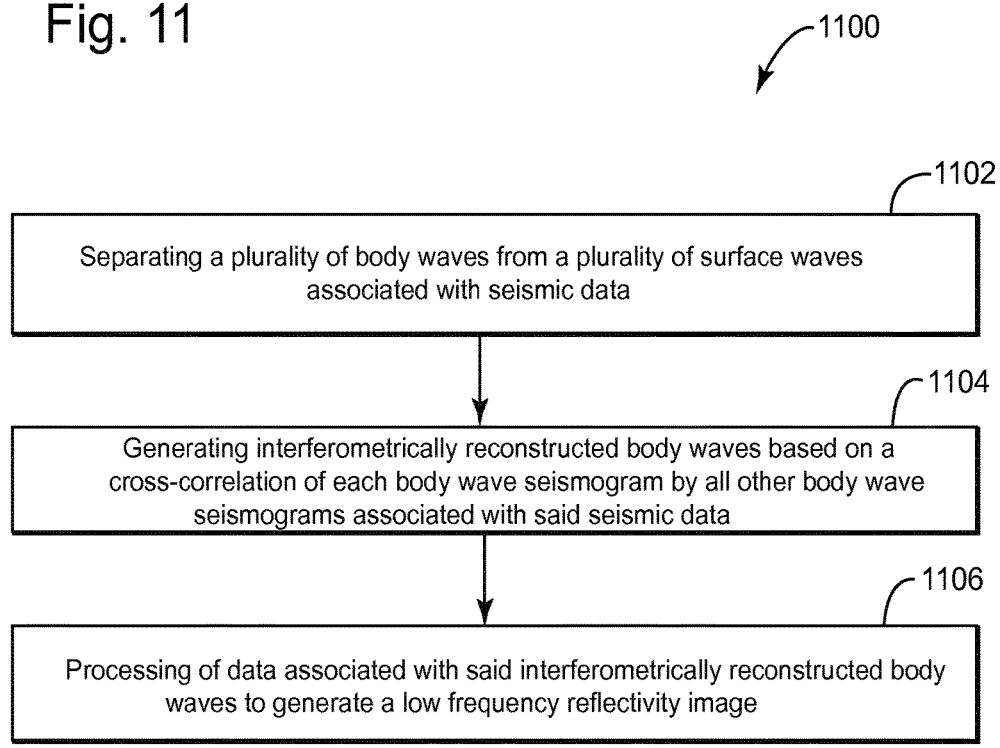
FIG. 11 is a flowchart of a method for generating a low frequency reflectivity image from seismic data.

FIG. 11 illustrates a method for the separation of surface waves and body waves and the interferometric reconstruction of the low-frequency component of reflectivity based on the separated body waves. In this regard, body waves are the waves that travel through the interior of the earth and include primary waves (P-waves), e.g., compressional waves that are longitudinal in nature, and secondary waves (S-waves), e.g., shear waves that are transverse in nature, while surface waves are those waves that travel at the Earth's surface. Beginning with step 1102, for each noise record, the surface waves are separated from the body waves. It should be noted that in the first method, the body wave estimate is based on the iterative subtraction of all noise sources and in the second method, the body wave estimate is obtained by zeroing the surface wave zone of the F-Kx-Ky transform, 3D frequency-wavenumber (3DFK) filtering, and reconstruction of the $\{t,x,y\}$ data by inverse Fourier transform. It should further be noted that in both methods, because of aliasing, the efficiency of this process decreases sharply at frequencies above $V_0/((2)(RLI))$. Continuing with step 1104, the interferometric reconstruction for each noise record includes correlating each body wave seismogram by all other body waves and summing the cross correlations over all the records. Next, at step 1106, the reflectivity image is generated. Conventional processing techniques developed for imaging 3D seismic data and known to those skilled in the art may be used to turn the summed cross correlations into a low frequency reflectivity image. The low frequency reflectivity image can then be calibrated and merged with conventional seismic images. Aspects related to the calibration and merging processes are also known to those skilled in the art and are not described here. The above referenced techniques are available as software packages for further processing steps associated with the embodiments described herein.

Figure 12:
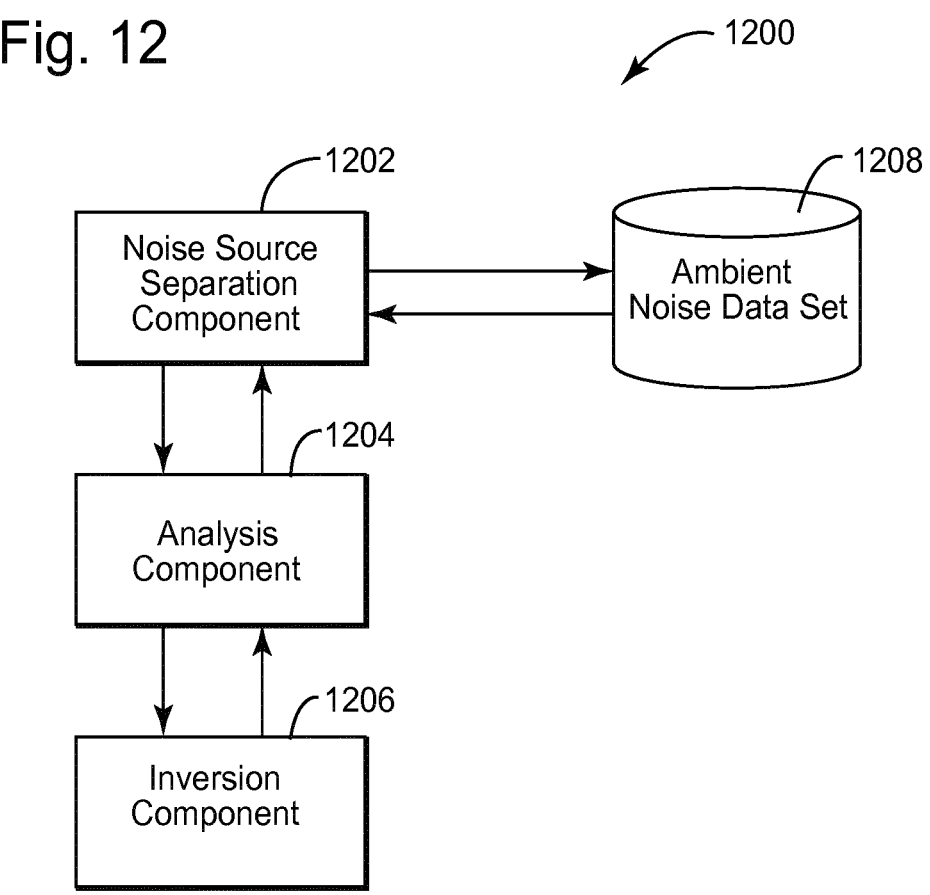
FIG. 12 is a schematic diagram of software components for implementing one or more of the above methods.

FIG. 12 is a schematic diagram of an embodiment system 1200 for generating S-wave velocity information based on low-frequency content of ambient noise. Ambient noise data 1208 can be a dedicated ambient noise record or a production seismic data record associated with the receivers of a three-dimensional seismic survey. The system 1200 includes a noise source separation component 1202, an analysis component 1204, an inversion component 1206, and an ambient noise dataset 1208. The noise source separation component 1202 provides the capability to identify and separate noise sources from the ambient noise dataset 1208.

Analysis component 1204 provides the capability to select and apply a velocity model to the data associated with the separated noise sources while the inversion component 1206 provides the capability for transforming the velocity-frequency data into velocity-depth data.

Figure 13:
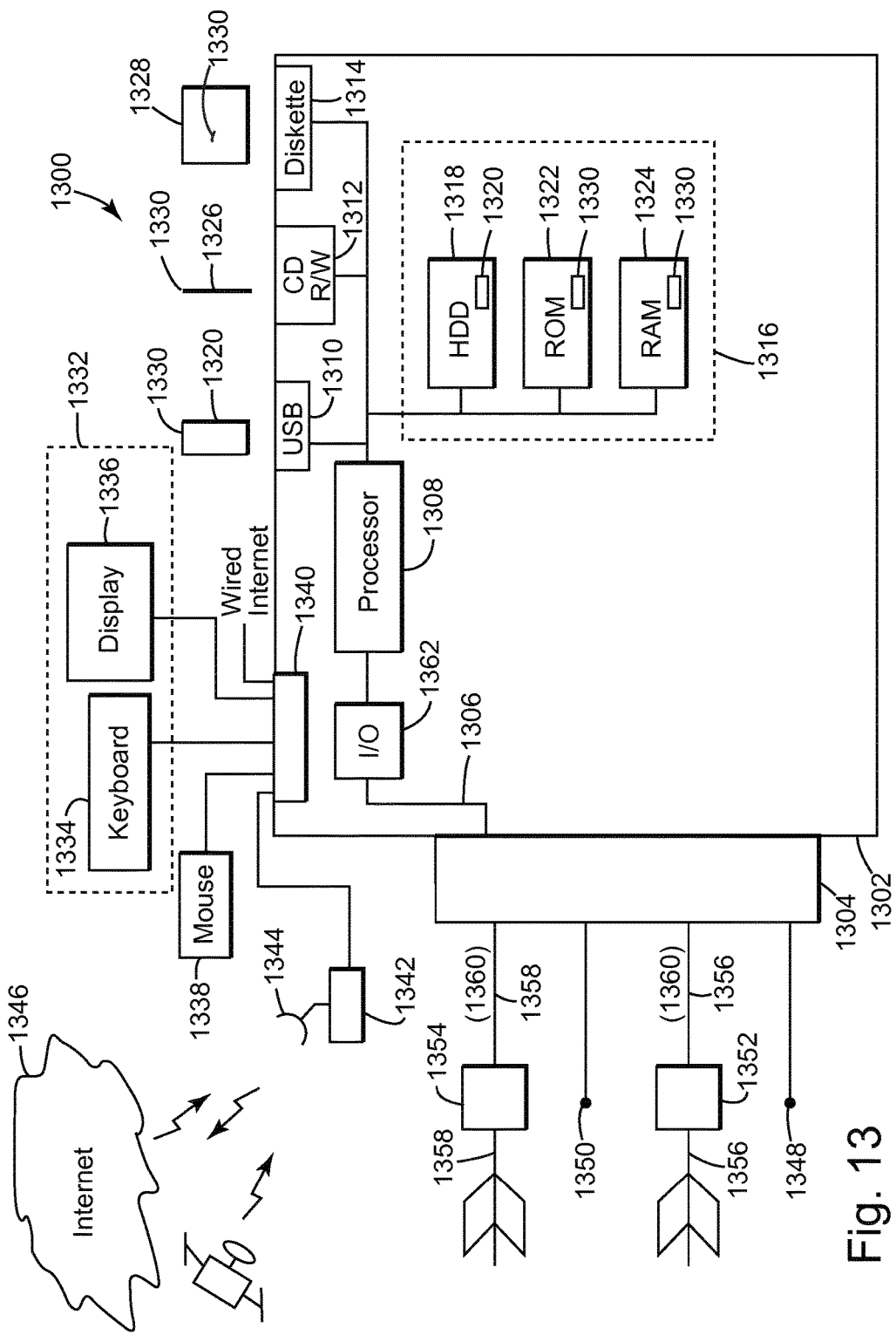
FIG. 13 illustrates an exemplary data processing device or system which can be used to implement the methods.

The computing device(s) or other network nodes involved in multi-component dip filtering of ground roll noise as set forth in the above described embodiments may be any type of computing device capable of processing and communicating seismic data associated with a seismic survey. An example of a representative computing system capable of carrying out operations in accordance with these embodiments is illustrated in FIG. 13. System 1300 includes, among other items, server 1302, source/receiver interface 1304, internal data/communications bus (bus) 1306, processor(s) 1308, universal serial bus (USB) port 1310, compact disk (CD)/digital video disk (DVD) read/write (R/W) drive 1312, floppy diskette drive 1314 (though less used currently, many servers still include this device), and data storage unit 1316.

Data storage unit 1316 itself can comprise hard disk drive (HDD) 1318 (these can include conventional magnetic storage media, but, as is becoming increasingly more prevalent, can include flash drive-type mass storage devices 1320, among other types), ROM device(s) 1322 and random access memory (RAM) devices 1324. Usable with USB port 1310 is flash drive device 1320, and usable with CD/DVD R/W device 1312 are CD/DVD disks 1326 (which can be both read and write-able). Usable with diskette drive device 1314 are floppy diskettes 1328. Each of the memory storage devices, or the memory storage media (1318, 1320, 1322, 1324, 1326, and 1328, among other types), can contain parts or components, or in its entirety, executable software programming code (software) 1330 that can implement part or all of the portions of the method described herein. Further, processor 1308 itself can contain one or different types of memory storage devices (most probably, but not in a limiting manner, RAM memory storage media 1324) that can store all or some of the components of software 1330.

In addition to the above described components, system 1300 also includes user console 1332, which can include keyboard 1334, display 1336, and mouse 1338. All of these components are known to those of ordinary skill in the art, and this description includes all known and future variants of these types of devices. Display 1336 can be any type of known display or presentation screen, such as liquid crystal displays (LCDs), light emitting diode displays (LEDs), plasma displays, cathode ray tubes (CRTs), among others. User console 1332 can include one or more user interface mechanisms such as a mouse, keyboard, microphone, touch pad, touch screen, voice-recognition system, among other inter-active inter-communicative devices.

User console 1332, and its components if separately provided, interface with server 1302 via server input/output (I/O) interface 1340, which can be an RS232, Ethernet, USB or other type of communications port, or can include all or some of these, and further includes any other type of communications means, presently known or further developed. System 1300 can further include communications satellite/global positioning system (GPS) transceiver device 1342, to which is electrically connected at least one antenna 1344 (according to an embodiment, there would be at least one GPS receiver-only antenna, and at least one separate satellite bi-directional communications antenna). System 1300 can access internet 1346, either through a hard wired connection, via I/O interface 1340 directly, or wirelessly via antenna 1344, and transceiver 1342.

Server 1302 can be coupled to other computing devices, such as those that operate or control the equipment of truck 114 of FIG. 1, via one or more networks. Server 1302 may be part of a larger network configuration as in a global area network (GAN) (e.g., internet 1346), which ultimately allows connection to various landlines.

According to a further embodiment, system 1300, being designed for use in seismic exploration, will interface with one or more sources 1348, 1350 and one or more receivers 1352, 1354. As further previously discussed, sources 1348, 1350 and receivers 1352, 1354 can communicate with server 1302 either through an electrical cable that is part of streamer 1356, 1358, or via a wireless system that can communicate via antenna 1344 and transceiver 1342 (collectively described as communications conduit 1360).

According to further exemplary embodiments, user console 1332 provides a means for personnel to enter commands and configuration into system 1300 (e.g., via a keyboard, buttons, switches, touch screen and/or joy stick). Display device 1336 can be used to show: source/receiver 1356, 1358 position; visual representations of acquired data; source 1348, 1350 and receiver 1352, 1354 status information; survey information; and other information important to the seismic data acquisition process. Source and receiver interface unit 1304 can receive the seismic data from receiver 1352, 1354 though communication conduit 1360 (discussed above). Source and receiver interface unit 1304 can also communicate bi-directionally with sources 1348, 1350 through the communication conduit 1360. Excitation signals, control signals, output signals and status information related to source 1348, 1350 can be exchanged by communication conduit 1360 between system 1300 and source 1348, 1350.

System 1300 can be used to implement the methods described above associated with multi-component dip filtering of ground roll noise according to an exemplary embodiment. Hardware, firmware, software or a combination thereof may be used to perform the various steps and operations described herein. According to an exemplary embodiment, software 1330 for carrying out the above discussed steps can be stored and distributed on multi-media storage devices such as devices 1318, 1320, 1322, 1324, 1326, and/or 1328 (described above) or other form of media capable of portably storing information (e.g., universal serial bus (USB) flash drive 1320). These storage media may be inserted into, and read by, devices such as the CD-ROM drive 1312, the disk drive 1314, among other types of software storage devices.

The disclosed exemplary embodiments provide a computing device, software and method for determining a velocity model from ambient noise. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for exploring an underground formation, the method comprising:
   receiving low frequency content of ambient noise associated with seismic data acquired for the underground formation;
   identifying one or more locations of one or more sources of the ambient noise for each of a plurality of analyzed frequencies;
   separating low frequency content associated with each of the one or more sources of ambient noise using the one or more locations;
   generating a plurality of velocity versus frequency functions associated to geographical locations based on an analysis of the low frequency content associated with each of the one of the one or more sources of ambient noise; and
   transforming the plurality of velocity versus frequency functions into a plurality of velocity versus depth functions indicating structure of the underground formation.

2. The method of claim 1, wherein the separating is performed in a frequency-horizontal coordinates domain.

3. The method of claim 2, wherein the separating is based on an analysis of phase maps.

4. The method of claim 1, wherein the noise data is recorded on a seismic data production record associated with receivers of a three-dimensional seismic survey.

5. The method of claim 1, wherein the generating is based on one of a plurality of analysis models wherein the one of a plurality of analysis models is selected based on factors associated with the seismic data.

6. The method of claim 5, wherein the factors comprise spatial sampling data density, seismic/non-seismic noise ratio, data quality and residual interference separation data quality.

7. The method of claim 5, wherein the one of a plurality of analysis models is an isotropic one-dimensional velocity model or an azimuthally anisotropic one-dimensional velocity model or an isotropic three-dimensional velocity model or an azimuthally anisotropic three-dimensional velocity model.

8. The method of claim 1, wherein the generating the plurality of velocity versus frequency functions is based on one or more local parameters comprising mean velocity, azimuth dependent velocity, azimuth of fast axis and ratio of fast and slow velocities.

9. The method of claim 1, wherein a low frequency body wave estimate is generated by subtraction of surface wave data from the low frequency content, and the body wave estimate is used to construct reflectivity data.

10. The method of claim 9, wherein the reflectivity data is obtained by correlating the body wave estimate associated with each receiver by all other body wave estimates.

11. An apparatus for exploring structure of an underground formation, the apparatus comprising:
an interface for receiving low frequency content of ambient noise associated with seismic data acquired for the underground formation; and
a data processing unit configured to the interface and configured:
to identify one or more locations of one or more sources of the ambient noise for each of a plurality of analyzed frequencies;
to separate low frequency content associated with each of the one or more sources of ambient noise using the one or more locations;
to generate a plurality of velocity versus frequency functions associated to geographical locations based on an analysis of the low frequency content associated with each of the one of the one or more sources of ambient noise; and
to transform the plurality of velocity versus frequency functions into a plurality of velocity versus depth functions indicating structure of the underground formation.

12. The apparatus of claim 11, wherein the data processing unit separates the low frequency content associated with each of the one or more sources of ambient noise in a frequency-horizontal coordinates domain.

13. The apparatus of claim 12, wherein the data processing unit uses an analysis of phase maps to separate the low frequency content associated with each of the one or more sources of ambient noise.

14. The apparatus of claim 11, wherein the noise data is included in a seismic data production record associated with receivers of a three-dimensional seismic survey.

15. The apparatus of claim 11, wherein the data processing unit generates a plurality of velocity versus frequency functions associated to geographical locations using one of a plurality of analysis models, wherein the one of the plurality of analysis models is selected based on factors associated with the seismic data.

16. The apparatus of claim 15, wherein the factors comprise spatial sampling data density, seismic/non-seismic noise ratio, data quality and residual interference separation data quality.

17. The apparatus of claim 15, wherein the one of a plurality of analysis models is an isotropic one-dimensional velocity model, an azimuthally anisotropic one-dimensional velocity model, an isotropic three-dimensional velocity model or an azimuthally anisotropic three-dimensional velocity model.

18. The apparatus of claim 11, wherein the data processing unit generates the plurality of velocity versus frequency functions based on one or more local parameters comprising mean velocity, azimuth dependent velocity, azimuth of fast axis and ratio of fast and slow velocities.

19. The apparatus of claim 11, wherein the data processing unit is further configured to generate a low frequency body wave estimate by subtracting surface wave data from the low frequency content, and the body wave estimate is used to construct reflectivity data.

20. The apparatus of claim 19, wherein the reflectivity data is obtained by correlating the body wave estimate associated with each receiver by all other body wave estimates.

* * * * *